March 14, 1961 P. C. GOLDMARK 2,974,961

PHONOGRAPH REPRODUCER

Filed Sept. 12, 1955 4 Sheets-Sheet 1

INVENTOR
PETER C. GOLDMARK
BY
Campbell, Brumbaugh, Free & Graves
HIS ATTORNEYS

March 14, 1961 P. C. GOLDMARK 2,974,961

PHONOGRAPH REPRODUCER

Filed Sept. 12, 1955 4 Sheets-Sheet 2

INVENTOR
PETER C. GOLDMARK
BY
Campbell, Brumbaugh, Free & Graves
HIS ATTORNEYS

March 14, 1961 P. C. GOLDMARK 2,974,961

PHONOGRAPH REPRODUCER

Filed Sept. 12, 1955 4 Sheets-Sheet 3

INVENTOR
PETER C. GOLDMARK
BY
Campbell, Brumbaugh, Free & Graves
HIS ATTORNEYS

INVENTOR
PETER C. GOLDMARK
BY
Campbell, Brumbaugh, Free & Graves
HIS ATTORNEYS

United States Patent Office 2,974,961

Patented Mar. 14, 1961

2,974,961

PHONOGRAPH REPRODUCER

Peter C. Goldmark, New York, N.Y., assignor to Columbia Broadcasting System, Inc., New York, N.Y., a corporation of New York Filed Sept. 12, 1955, Ser. No. 533,615

4 Claims. (Cl. 274—9)

The present invention relates to phonograph reproducer apparatus and more particularly to new and improved phonograph record player apparatus that is capable of effective operation when mounted on an unstable support such as a moving vehicle, for example.

While phonograph record player apparatus has been developed in recent years which is capable of excellent performance when operated on a stable mount, up to the present there has been no practical form of record player capable of affording reproduction of good quality when mounted on an unstable support. An automobile, for example, is subjected to a wide variety of shocks, bumps and accelerations in its normal usage which would seriously impair the quality of reproduction of and would probably damage any conventional phonograph record player operated thereon.

It is an object of the invention to provide new and improved phonograph record player apparatus which is free from the above-noted deficiencies of the prior art devices.

Another object of the invention is to provide new and improved record player apparatus of the above character which is not adversely affected by instability of the support on which it is mounted and requires a minimum of care and attention in its operation.

These and other objects of the invention are attained by providing a resilient shock mounting for the phonograph reproducer in which the mass of the reproducer is so distributed relatively to the support afforded by the shock mounting that translatory accelerations or acceleration components of the unstable support do not tend to produce angular accelerations of the turntable about the record spindle. Moreover, the pickup arm is mounted for turning movement only in a plane parallel to the turntable and it is counterbalanced so that there is no tendency for it to swing when a sudden shock is applied to its support. Preferably, suitable damping means is provided between the pickup arm and its support, so as to resist sudden forces applied to the pickup arm, as when the vehicle rounds a turn, for example, while allowing slow movement of the latter, as required in normal operation of the reproducer.

The pickup cartridge is pivotally mounted on the pickup arm for movement towards and away from the record and it is also counterbalanced so that it does not move relatively to the pickup arm when the reproducer is suddenly moved or jolted in a direction normal to the plane of the turntable. Preferably, spring means is provided for normally urging the cartridge towards the turntable so as to maintain the cartridge stylus in engagement with the record groove while a record is being played.

It will be apparent, therefore, that the phonograph reproducer apparatus of the invention is particularly suited for use on an unstable support such as an automobile, for example.

For a better understanding of the invention, reference is made to the following detailed description of a representative embodiment, taken in conjunction with the accompanying drawings, in which.

While the novel phonograph reproducer apparatus of the invention may be used on any unstable support, it will be described herein by way of illustration as adapted for use in an automotive vehicle.

Figure 1:
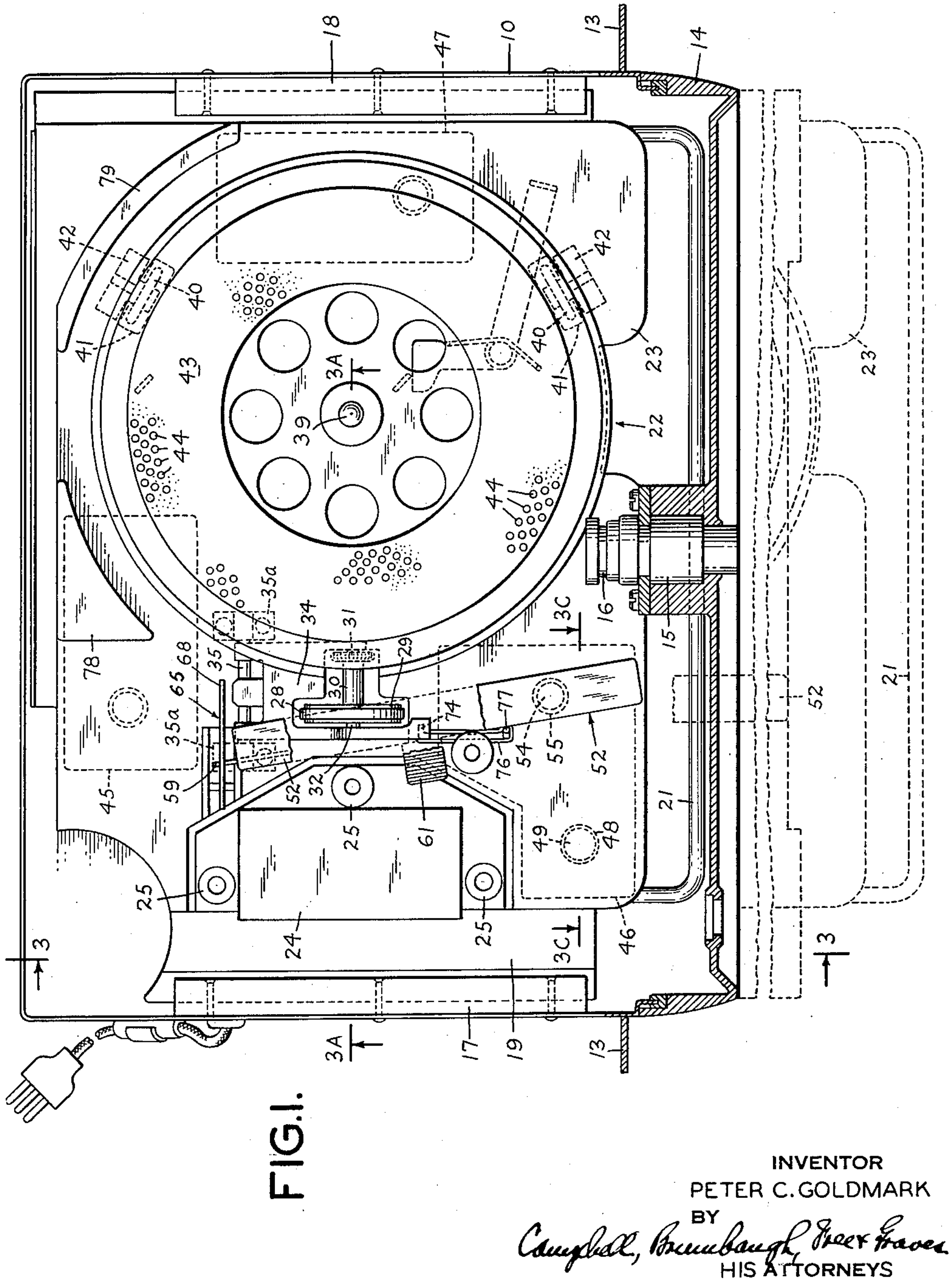
Fig. 1 is a plan view of phonograph reproducer apparatus constructed according to the invention.
Figure 2:
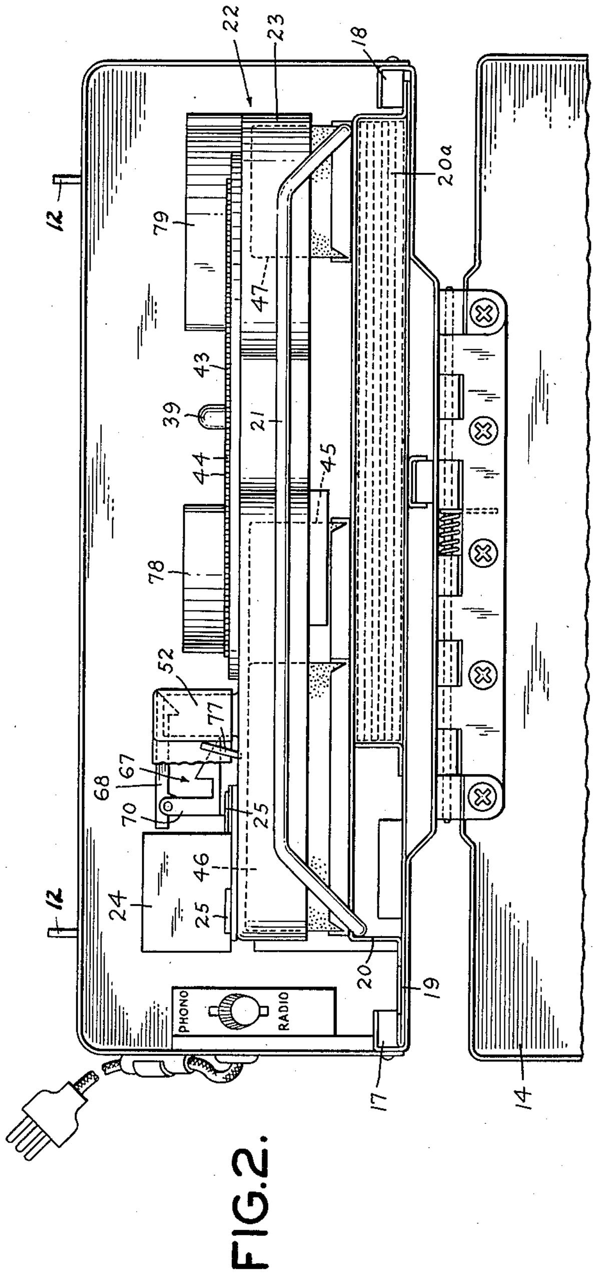
Fig. 2 is a front view in elevation of the reproducer apparatus shown in Fig. 1.
Figure 3:
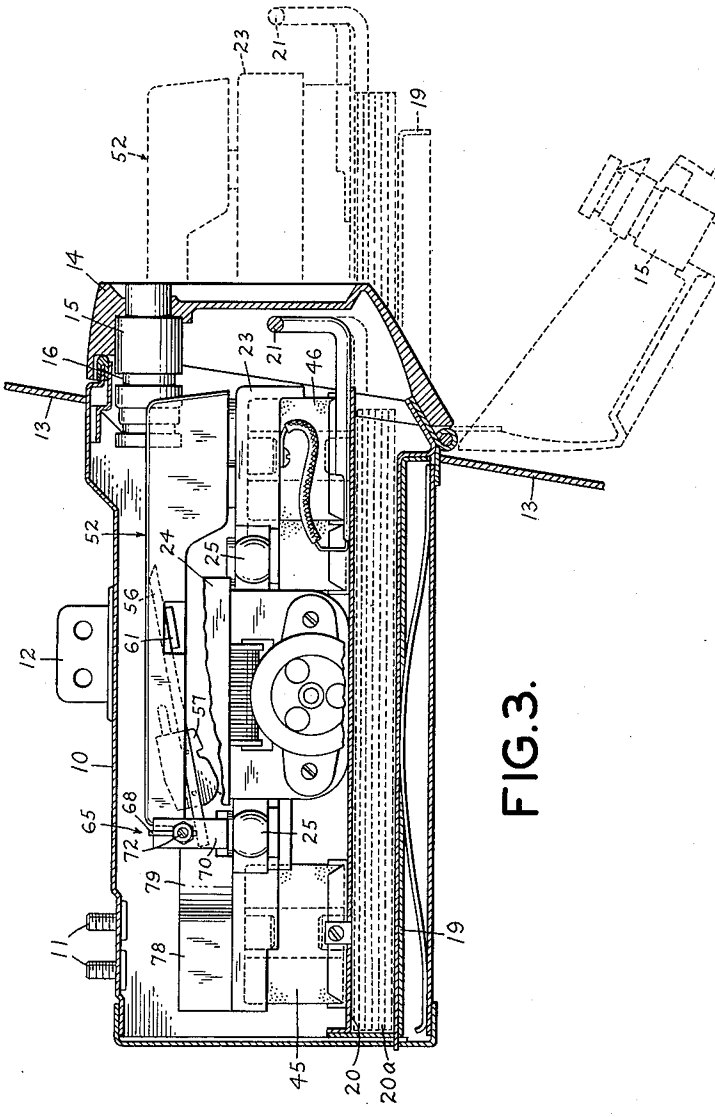
Fig. 3 is a side view of the phonograph reproducer shown in Fig. 1, in section, taken along the line 3—3 of Fig. 1 and looking in the direction of the arrows.

Referring to Figs. 1, 2 and 3, the phonograph reproducer apparatus may be mounted in a rectangular container 10 of the type currently used to house a car radio having suitable means such as bolts 11 and lugs 12 whereby it may be secured behind the dashboard 13 of an automobile. The container 10 has a hinged lid 14 which, when opened, is adapted to drop down to the position shown in Fig. 2. The lid 14 may be locked in the closed position by a suitable lock 15 which is adapted to cooperate with a detent 16 formed at the upper inside edge of the container 10, as shown in Fig. 3.

Mounted for sliding movement into and out of the container 10 between the bottom of the latter and the guide members 17 and 18 is a tray 19 having a base 20 secured thereon. The tray 19 is adapted to be pulled out of the container 10 to the position shown in dotted lines in Fig. 1 by means of a handle 21, the opposite ends of which are secured to the base member 20, as shown. In the space between the base member 20 and the tray 19 is formed a record storage compartment 20*a*. Mounted on the base member 20 in a manner to be described in greater detail below is a phonograph reproducer 22 embodying phonograph pickup means constructed according to the invention.

The phonograph reproducer 22 comprises a plate 23 at one end of which is mounted an electric motor 24. The motor 24 is supported on the plate 23 by a plurality of tubular shock absorbers 25 (Figs. 1 and 3A) which serve to minimize the transmission of vibration from the motor 24 to the phonograph pickup.

Figures 3A, 3B, 3C:
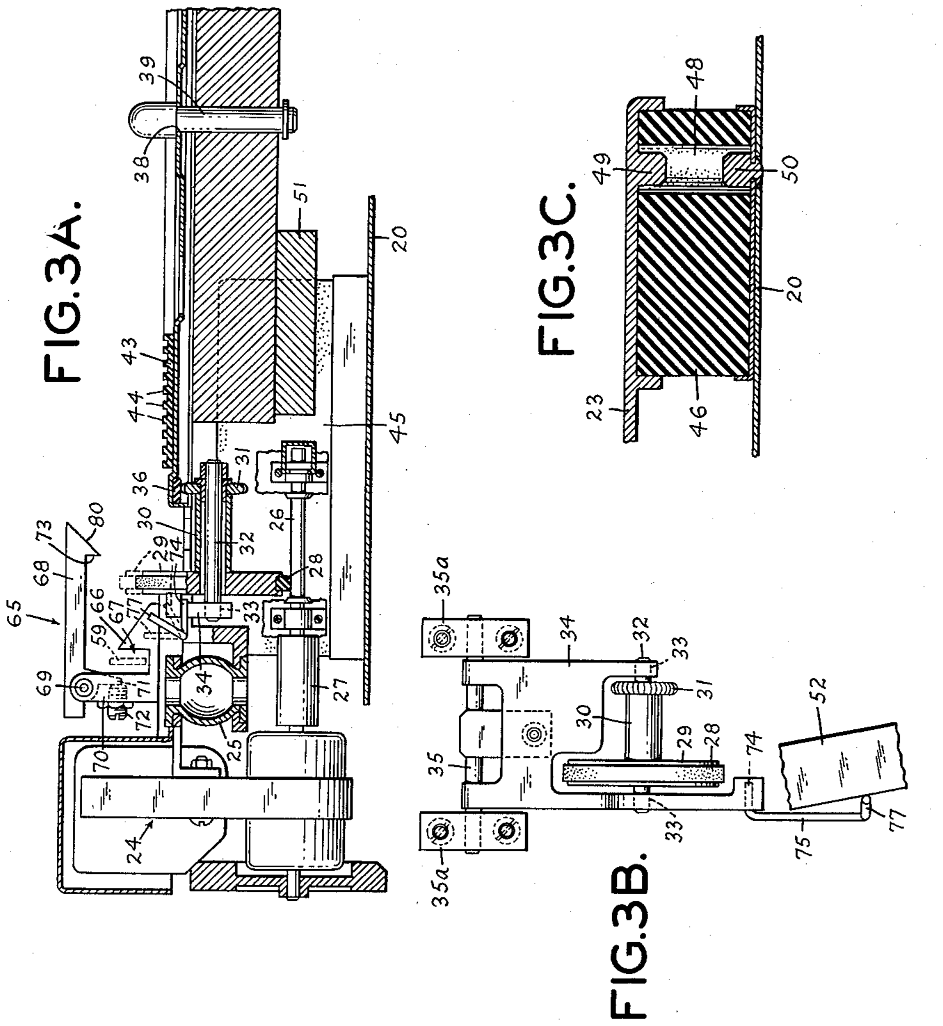
Fig. 3A is a fragmentary view taken along the line 3A—3A of Fig. 1 and looking in the direction of the arrows.
Fig. 3B illustrates a detail of the reproducer apparatus shown in Fig. 1.
Fig. 3C is a fragmentary view in section taken along line 3C—3C of Fig. 1 and looking in the direction of the arrows.

As best shown in Fig. 3A, the motor 24 drives a shaft 26 through a universal coupling 27. The shaft 26 engages the rubber rim 28 of an idler wheel 29 having a hub 30 on which a wheel 31 of smaller diameter and having a knurled rim is also mounted. The idler assembly comprising the idler wheel 29, the hub 30 and the knurled wheel 31 are rotatably mounted on a shaft 32 journaled in bearings 33 in a link 34 (Fig. 3B) which is pivotally mounted on a rod 35 journaled in bearings 35*a* secured to the underside of the plate 23 (Fig. 1).

The knurled wheel 31 engages the undersurface of an annular ring 36 of rubber or other suitable flexible material which is secured beneath a phonograph turntable 37 adjacent the outer rim thereof. The turntable 37 is provided with a center hole 38 which is rotatably mounted on a spindle 39 carried by the frame 23.

The turntable 37 is supported at two other positions, preferably located 120° on either side of the knurled wheel 31, by rollers 40 made of rubber or other similar material, which extend through apertures 41 formed in the frame 23 and are journaled in suitable bearings 42 secured to the underside of the plate 23. In order to minimize slippage between a record to be played and the turntable 37, an annular strip 43 of rubber or other suitable material formed with small upwardly extending projections 44 on the upper surface thereof is preferably secured on the top side of the turntable 37.

In order to minimize the effect of sudden shocks or accelerations upon the phonograph reproducer 22, the plate 23 is supported on blocks 45, 46 and 47 of resilient material, such as foam rubber, for example, which are snugly fitted into recesses of the same general shape formed in the underside of the plate 23 and in the base member 20. Also, the block 46 is provided with a vertical bore 48 into the opposite ends of which opposed projections 49 and 50 on the plate 23 and on the base member 20, respectively, project, as shown in greater detail in Fig. 3C to retain the block 46 securely in proper relation to the plate 23 and the base member 20. Similar means (not shown) are provided for retaining the blocks 45 and 47 in their proper positions.

According to the invention, the distribution of the mass of the phonograph reproducer 22 relatively to the support compliance i.e., the extent of yield in response to an applied force afforded by the blocks 45, 46 and 47 is so adjusted that a forward or rearward acceleration of the vehicle on which the phonograph reproducer is mounted will not cause any angular rotation of the phonograph reproducer which might affect the speed of rotation of the turntable 37. In this way, the support blocks need not be distributed symmetrically about the center of support compliance, i.e., the point at which an applied force will cause all the support blocks to yield equally, since the blocks may be of different size and, consequently, different resilience, as shown in the drawings. This arrangement requires only that the center of support compliance coincide with the center of mass of the plate 23 and the components mounted thereon. To this end, one or more ballast weights 51 (Fig. 3A) may be secured to the plate 23 of the phonograph reproducer 22, as required.

Figure 5:
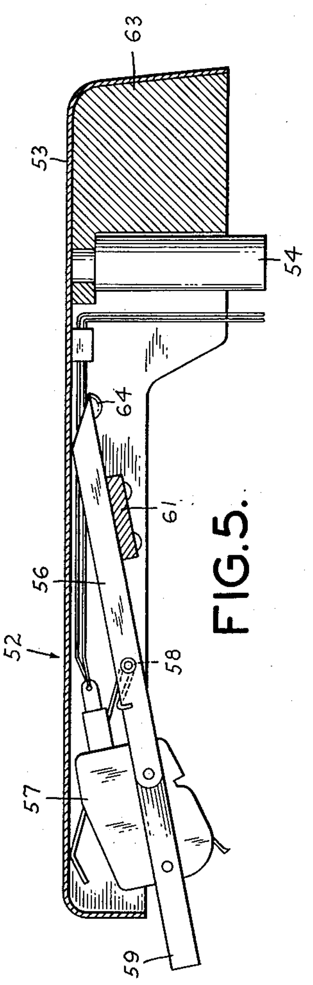
Fig. 5 is a side view in longitudinal section taken along the line 5—5 of Fig. 4 and looking in the direction of the arrows.
Figure 4:
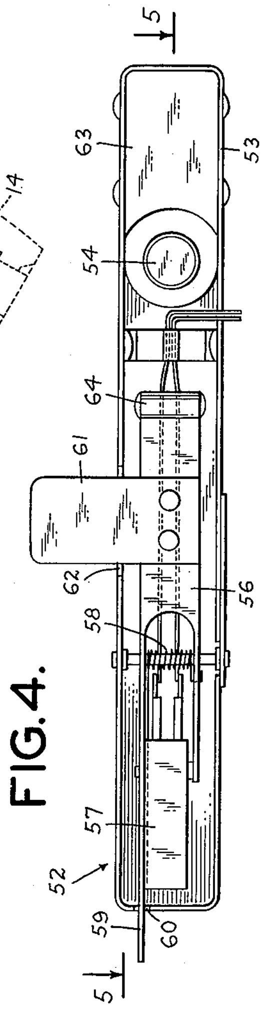
Fig. 4 is a bottom view of a typical phonograph pickup device that may be used in the reproducer of Fig. 1.

The phonograph reproducer 22 is also provided with a novel counterbalanced pickup arm assembly which is insensitive to sudden shocks and accelerations such as might be imparted to it when the supporting automobile is in operation. As shown in Figs. 4 and 5, the pickup assembly 52 comprises a housing 53 fixedly secured at its rear end to a shaft 54 which is adapted to be snugly received within a bore 55 (Fig. 1) formed in the plate 23, so as to permit turning movement of the pickup assembly 52 only in a horizontal plane. Pivotally mounted in the forward portion of the housing 53 is a channel member 56 having a conventional phonograph cartridge 57 secured at the front end thereof. A compression spring 58 normally urges the cartridge 57 towards the surface of a record to be played.

The forward end of the channel member 56 is provided with an extension 59 which lies beyond the front end of the housing 53 and is movable into and out of a slot 60 formed therein. The channel member 56 also has secured thereto a laterally extending actuator 61 which is movable into and out of a slot 62 formed in the housing 53.

In accordance with the invention, the pickup 52 has a counterweight 63 secured at the rear end of the housing 53 which is so designed that a sudden shock or acceleration at an angle to the shaft 54 will not produce any turning movement of the pickup 52 about the shaft 54. Similarly, a counterweight 64 is secured at the rear end of the channel member 56 in such fashion that any sudden acceleration or shock along the axis of the shaft 54 will not produce any turning movement of the channel member 56 about its pivot. Further, a suitable viscous damping material such as a silicone grease, for example, is applied between the shaft 54 and the bore 55 so as to provide viscous damping for the pickup 52 tending to oppose any sudden turning movement thereof about the shaft 54 while permitting slow turning movement as required during the playing of a record. In other words, the action of the pickup arm is controlled largely by the resistance introduced by the viscous damping instead of by the mass of the arm as in conventional pickups.

When the phonograph is not in use, the pickup arm 52 is adapted to be locked in its initial position by a latching assembly 65 (Figs. 1 and 3A) including an inclined portion 66 along which the extension 59 (Fig. 4) on the pickup 52 is adapted to be moved and a slot 67 in which the extension 59 is adapted to be received. The latching assembly 65 is also provided with a laterally extending arm 68 which is pivoted at 69 on an upright member 70 and is maintained substantially horizontal by stop means comprising a downwardly extending portion 71 on the arm 68 which is adapted to cooperate with a set screw 72 for this purpose. The arm 68 has a detent 73 formed at its outer end which is adapted to cooperate with the pickup extension 59 when the latter is raised by depressing the actuator 61 to establish the correct starting position for the pickup when playing a record.

In order to prevent deformation of the flexible rubber rim 28 on the wheel 29 when at rest on the shaft 26, it is desirable to provide means for disengaging the rim 28 from the shaft 26 when the phonograph reproducer is not in use. For this purpose, the free end of the link 34 (Fig. 3B) is supported by an arm 74 on a rod 75 mounted in a groove 76 formed in the base 23 and having an actuator 77 adapted to be actuated by the pickup 52 when it is moved to the starting position. When the pickup 52 is locked in its initial position with the extension 59 (Fig. 4) in the slot 67 (Fig. 3A), it holds the actuator 77 in the proper position to disengage the rim 28 on the wheel 29 from the shaft 26.

In operation, assuming that the pickup 52 is in its initial position with the extension 59 in the slot 67 of the latching mechanism 65, a record is placed on the turntable 37 and the motor 24 is started by closing a switch (not shown). In order to facilitate accurate placement of the record without the necessity for watching this operation, the plate 23 is provided with several arcuate guide members 78 and 79 (Fig. 1) which are so positioned relatively to the spindle 39 that if a record is moved into engagement with them and is then allowed to drop, it will fall into correct position with the spindle 39 in the center hole.

The actuator 61 (Fig. 4) is then depressed to lift the extension 59 out of the slot 67 (Fig. 3A) and is maintained depressed while the pickup 52 is turned in the direction of the turntable until the extension 59 engages the detent 73. The pickup stylus is now in the correct playing position. The actuator 61 is then released to permit the stylus to enter the initial record grooves and the record is played in the usual manner.

After the record has been played, the actuator 61 on the pickup 52 is depressed to lift the cartridge 57 away from the record surface and the pickup 52 is returned to its initial position, the pickup extension 59 being adapted to cooperate with an inclined surface 80 (Fig. 3A) on the arm 68 to lift the latter so that this may be done. When the extension 59 lies directly above the groove 67 in the latching mechanism 65 (Fig. 3A), the actuator 61 (Fig. 4) is released allowing the extension 59 to drop into the slot 67 and lock the pickup 52 in the rest position.

Simultaneously, the pickup 52 engages the actuator 77 on the rod 75 and moves it outwardly so that the arm 74 thereof lifts the free end of the link 34 (Figs.

1, 3A and 3B) and disengages the flexible rim 28 of the wheel 29 from the shaft 26 so as to prevent deformation of the rim 28 while the pickup 52 is in the rest position.

The invention thus provides novel and highly effective phonograph reproducer apparatus which can be used on an unstable support. By mounting the phonograph reproducer on resilient support means and adjusting the mass distribution relatively to the points of support as described above, the apparatus can be subjected to forward or rearward accelerations without producing any tendency of the apparatus to turn relatively to its support. Further, by counterbalancing the pickup arm and the pickup cartridge mounting as described above, and by providing suitable viscous damping for the pickup arm as proposed, the pickup is made relatively insensitive to sudden shocks which would normally tend to cause it to move either perpendicularly of the record or radially with respect thereto.

While a specific embodiment has been described in detail above, it is obviously susceptible of modification in form and detail within the spirit of the invention. The invention, therefore, is not to be restricted to the specific form disclosed herein but is intended to comprehend all modifications thereof falling within the scope of the appended claims.

I claim:

1. In phonograph reproducer apparatus for use on a movable vehicle, a phonograph support member, a turntable supported for rotary motion on the support member, a pickup arm supported on the support member at a location spaced from the axis of the turntable, the pickup arm being mounted for pivotal motion in a plane parallel to the turntable so that angular motion of the support member tends to turn the pickup arm with respect to the turntable, a base member mountable on the movable vehicle, and a plurality of resilient shock absorber means supporting the support member on the base member distributed unsymmetrically about the center of mass of the support member and arranged so that the center of support compliance afforded by the shock absorber means as defined by the point at which an applied force will cause all the shock absorber means to yield equally coincides with the center of mass distribution of the support member and phonograph apparatus mounted thereon, thereby preventing any angular motion of the support member with respect to the base member in response to linear accelerative forces in a plane parallel to the turntable.

2. Phonograph reproducer apparatus according to claim 1 including a pickup cartridge mounted near one end of the pickup arm to cooperate with a phonograph record supported on the turntable, counterweight means on the pickup arm counterbalancing the pickup arm so as to prevent any pivotal motion thereof in response to linear accelerative forces applied to the support member in the plane of the turntable, and viscous damping means damping the pickup arm and providing sufficient resistance to rapid pivotal motion thereof so that the reproducing action of the pickup cartridge is controlled by the resistance of the viscous means rather than by the inertia resulting from the mass of the pickup arm and relative rotation of the pickup arm in response to angular motion of the support member is prevented.

3. In phonograph reproducer apparatus for use on a moving vehicle, a phonograph support member, a turntable supported for rotary motion on the support member, vertical shaft means mounted on the support member at a location spaced from the axis of the turntable, a pickup arm supported by the vertical shaft means for pivotal motion only in a plane parallel to the turntable so that angular motion of the support member tends to turn the pickup arm with respect to the turntable, a base member mountable on the movable vehicle, a plurality of resilient shock absorber means supporting the support member on the base member, pickup cartridge means mounted near one end of the pickup arm to cooperate with a phonograph record supported on the turntable, counterweight means on the pickup arm counterbalancing the pickup arm so as to prevent any pivotal motion thereof in response to linear accelerative forces applied to the support member in the plane of the turntable, and viscous damping means applied to the vertical shaft means damping the pickup arm and providing sufficient resistance to rapid pivotal motion thereof so that the reproducing action of the pickup cartridge is controlled by the resistance of the viscous means rather than by the inertia resulting from the mass of the pickup arm and relative rotation of the pickup arm in response to sudden angular motion of the support member is prevented.

4. Phonograph reproducer apparatus according to claim 3 wherein the viscous damping means comprises silicone grease.

References Cited in the file of this patent

UNITED STATES PATENTS

| | | |
|---|---|---|
| 1,746,004 | Marshall | Feb. 4, 1930 |
| 1,895,126 | Hilgenberg | Jan. 4, 1933 |
| 1,917,633 | Burt | July 11, 1933 |
| 2,247,651 | Carson | July 1, 1941 |
| 2,263,979 | Bruno | Nov. 25, 1941 |
| 2,475,744 | Harman | July 12, 1949 |
| 2,506,692 | Thompson | May 9, 1950 |
| 2,551,506 | Rockwell | May 1, 1951 |
| 2,676,806 | Bachman | Apr. 27, 1954 |